United States Patent [19]
Hanyu et al.

[11] Patent Number: 5,579,450
[45] Date of Patent: Nov. 26, 1996

[54] IMAGE PROCESSING APPARATUS INVOLVING COMPARISON OF DENSITIES OF THREE CONTIGUOUS PIXELS

[75] Inventors: Hitomi Hanyu; Yoshiaki Hanyu, both of Soka, Japan

[73] Assignee: Ricoh Company, Ltd., Tokyo, Japan

[21] Appl. No.: 156,834

[22] Filed: Nov. 24, 1993

[30] Foreign Application Priority Data

Nov. 25, 1992 [JP] Japan .................................. 4-338070

[51] Int. Cl.$^6$ ...................................................... G06F 15/00
[52] U.S. Cl. ........................... 395/115; 395/128; 395/132; 358/447
[58] Field of Search ................................. 395/101, 102, 395/109, 115, 117, 118, 128, 129, 132; 358/458, 445, 447

[56] References Cited

U.S. PATENT DOCUMENTS

| | | | |
|---|---|---|---|
| 4,703,363 | 10/1987 | Kitamura | 358/284 |
| 4,751,585 | 6/1988 | Shibazaki | 358/294 |
| 4,841,375 | 6/1989 | Nakajima et al. | 353/280 |
| 4,937,761 | 6/1990 | Hassett | 364/518 |
| 5,029,108 | 7/1991 | Lung | 364/519 |
| 5,031,227 | 7/1991 | Roasch et al. | 382/22 |
| 5,159,665 | 10/1992 | Priem et al. | 395/134 |
| 5,299,028 | 3/1994 | Kwarta | 358/445 |
| 5,299,308 | 3/1994 | Suzuki et al. | 395/162 |
| 5,404,431 | 4/1995 | Kumazaki et al. | 395/143 |

OTHER PUBLICATIONS

Priem, Curtis, "Developing the GX Graphics Accelerator Architecture", Feb. 1990, IEEE/IEE Publications.

*Primary Examiner*—Edward L. Coles, Sr.
*Assistant Examiner*—Gabriel I. Garcia
*Attorney, Agent, or Firm*—Woodcock Washburn Kurtz Mackiewicz & Norris

[57] ABSTRACT

A graphics accelerator decides pixel densities using an anti-aliasing process for left and right edges of a figure in an image, and for sending resulting pixel density data to a frame memory. The apparatus includes a memory read/write controller inputs a contribution ratio, a density value, a "y" coordinate for a raster line, a start coordinate $x_1$, and an end coordinate $x_2$, and sends an address to the frame memory. A LUT provides pixel densities based on the contribution ratio and the density value. Three contiguous pixels' densities are latched, including densities for a middle pixel and two outer pixels. A comparing processor, decides a resulting pixel density corresponding to the middle pixel by comparing the densities of the three contiguous pixels, and deciding the resulting pixel density as being an intermediate value between the densities of the two outer pixels if the middle pixel's density is not between the densities of the two outer pixels, but deciding the resulting pixel density as being the density of the middle pixel if the middle pixel's density is between the densities of the two outer pixels. Identification densities for identifying edges of the figure are generated in the second position before the left edge of the figure and in the second position after the right edge of the figure.

7 Claims, 8 Drawing Sheets

FIG. 5  RIGHT EDGE PORTION OF AREA 2:50×0.6=30.0
RMW DENSITY = 30.0×(1−0.4)+35×0.4
= 32.0
50>32.0<35

RMW DENSITY = 51.2×(1−0.2)+50×0.2
= 50.96

RIGHT PORTION OF AREA 2 : 50 x 0.6 = 30.0
RMW DENSITY = 30.0 x (1 − 0.4) + 35 x 0.4
= 32.0

IMAGE PROCESSING APPARATUS INVOLVING COMPARISON OF DENSITIES OF THREE CONTIGUOUS PIXELS

BACKGROUND OF THE INVENTION

1. Field of the Invention

This invention relates to an image processing apparatus for use in a printer, between a host computer and a printer and the like such as a printer controller, which inputs a vector image and outputs a raster image using a page description language (this is referred to as PDL language hereinafter). The invention particularly relates to improvement when density data determined by an anti-aliasing process are written to a memory as executing read-modify-write (this is referred to as RMW hereinafter) process in the image processing apparatus and achieves better printing image quality finally.

2. Discussion of Background

Figure 8:
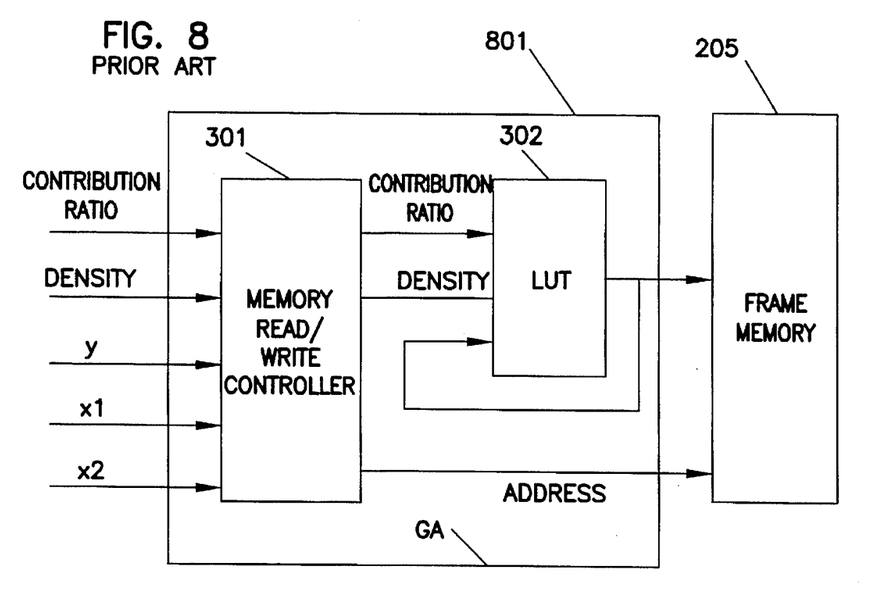
FIG. 8 is a block diagram of conventional GA.

An anti-aliasing process is known as improving printing quality in a printer controller. FIG. 8 is a block diagram showing a conventional graphic accelerator (this is referred to as GA hereinafter), in which the block 801 is a GA and the block 205 is a frame memory. GA 801 is composed of a memory read/write control block and a look-up-table (this is referred to as LUT hereinafter) 302.

The operation of GA 801 will be described. GA 801 inputs contribution ratio which is defined as (image area in pixel area)/(pixel area), image density, a coordinate line y for raster scanning, a start coordinate x1 and an end coordinate x2. Then it writes the data to the frame memory 205 on the basis of RMW process referring to LUT 302.

The operation of writing process to the memory including anti-aliasing process in a printer controller will be described using a flowchart of FIG. 9. The vector image is converted to the raster image according to control program (S 901). The raster conversion is that the image is divided into each coordinate line y, the contribution ratio of each pixel on the coordinate line y is decided (S 902). Then the pixel area of x coordinate which have the same contribution ratio and the same density is drawn. The drawing is as follows. The parameters of the coordinate line y for raster scanning, the start coordinate x1, and the end coordinate x2 of the area which has the same contribution ratio and the same density are inputted to the GA 801 (S 903). The GA 801 decides a final density by executing RMW process referring to the LUT 302 and writes the pixel data in memory address corresponded to the area between the start coordinate x1 and the end coordinate x2 on the coordinate line y (S 904). It is judged that this operation is executed for all pixel data or not. If this operation is not judged the end, it is repeated. If the operation is judged the end, it is finished.

Figure 10:
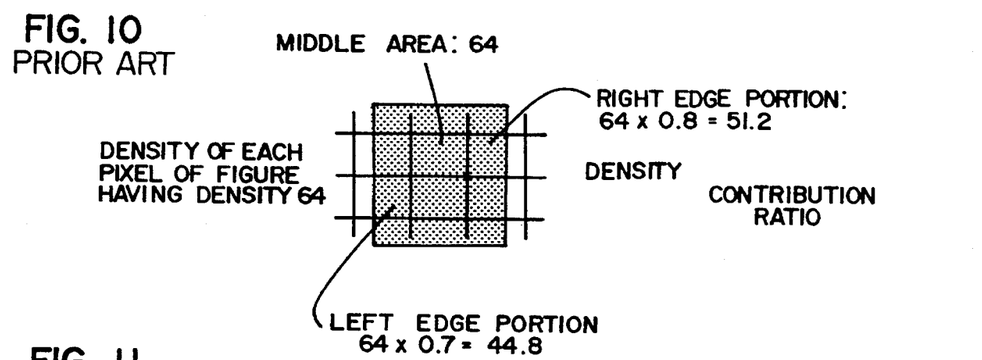
FIG. 10 shows an illustration of one step of anti-aliasing process.

FIG. 10 is a illustration indicating the anti-aliasing process. When the vector image is converted to the raster image as described above, the density of the edge portion of the image is decided by the contribution ratio, that is (image area in pixel area)/(pixel area). Therefore the density of the edge portion becomes weaker and a smooth image can be obtained visually. Then the density data is written to the frame memory 205 as executing the RMW process.

Figure 11:
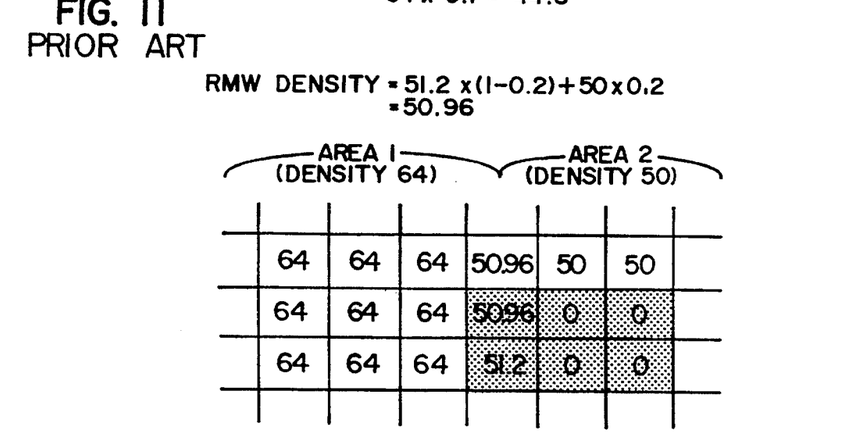
FIG. 11 shows an illustration of conventional RMW process.

FIG. 11 is a illustration indicating the RMW process. For example, after the area 1 of the density 64 is drawn, the area 2 of the density 50 is drawn. In FIG. 11, the left edge portion of the area 2 overlaps the right edge portion of the area 1. The density which is already written in the frame memory 205 is 52, and the density and the contribution ratio which are overlaped are 50 and 0.2 respectively. So according to the RMW process, the final density is decided by the following $$51.2*(1-0.2)+50*0.2=50.96.$$

However, in the conventional image processing apparatus which executes the anti-aliasing as described above, some problems occur by the RMW process when the result of the anti-aliasing process is written to the frame memory.

Figure 12:
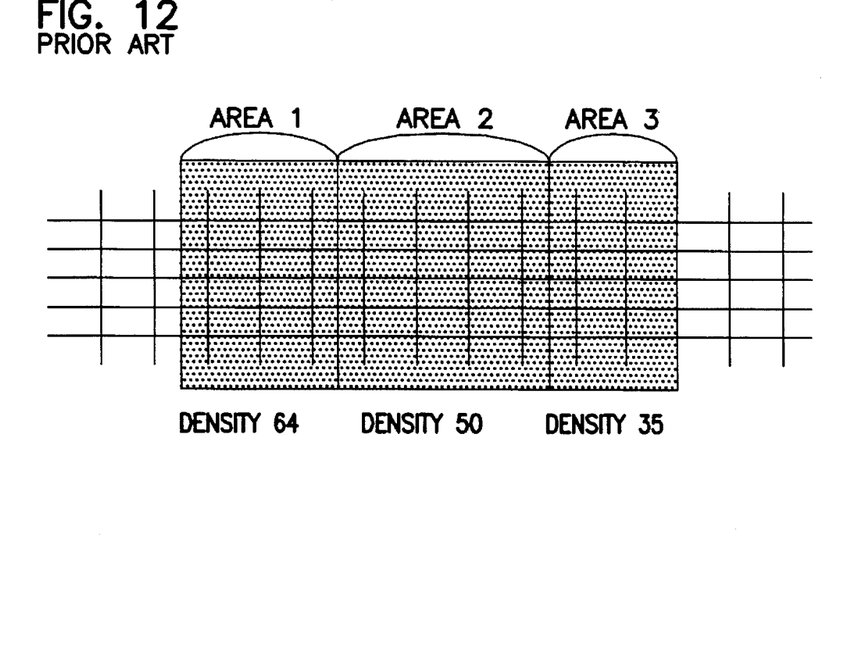
FIG. 12 shows an illustration in which there is a gradation image and density of an image varies gradually.
Figure 13:
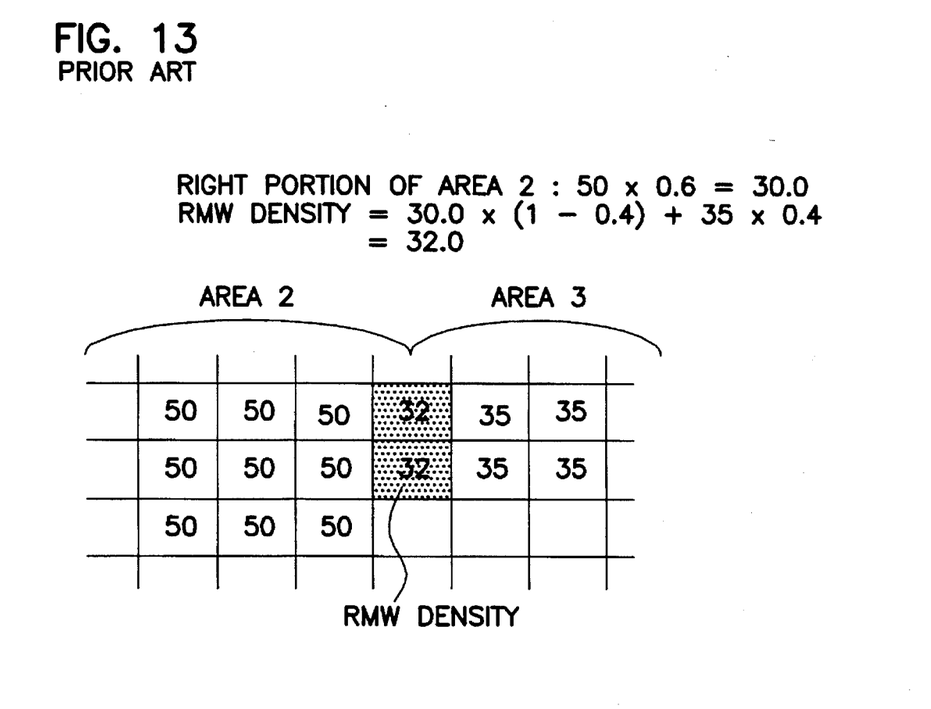
FIG. 13 shows an illustration of image problem of the conventional RMW process.

The problems will be described in FIG. 12 and FIG. 13. As shown in FIG. 12 and FIG. 13, when there is a gradation image and the density of the image varies gradually, the following first problem occurs. That is, the density of the boundary pixel in which includes two edge portions of adjacent areas becomes weaker than each density of the right and the left pixels of the boundary pixel.

This first problem can be solved by the following. Before the density by the RMW process is written to the frame memory 205, the densities of the right and the left pixels are referred. If the density is between the density of the right pixel and that of the left one, writing to the frame memory 205 is executed. If not, the middle density value between the density of the right pixel and that of the left one is written. When this process is executed in FIG. 13, the result in FIG. 5 can be obtained. However, as the process is executed by software convetionally, the second problem, that is long processing time and is not efficient, occurs.

SUMMARY AND OBJECT OF THE INVENTION

Accordingly, one object of this invention is to provide an image processing apparatus which is executed by anti-aliasing process, in which better image quality and high-speed processing can be achieved by minimum modification of hardware and software even when there is a gradation image and density of an image varies gradually.

Another object of this invention is to provide an image processing apparatus which is executed by the anti-aliasing process, in which better image quality and high speed processing can be achieved by modification of hardware and software when data is written to a frame memory as executing RMW process, even when there is a gradation image and the density of the image varies gradually.

These and other objects and advantages are achieved by the present invention which provides for an image processing apparatus comprising memory read/write controller which input contribution ratio, density, coordinate line y for raster scanning, start coordinate x1, and end coordinate x2, and which generate address for the memory means, and a look-up-table which decide the each pixel density by the contribution ratio and the density and execute read-modify-write process;

a three pixels comparing hardware which latches densities of continuous three pixels, and a comparing processor which compares the densities of the continuous three pixels and decides the density value of the middle position of the three pixels by the other density values of the three pixels, and which sends the density data to the memory means.

BRIEF DESCRIPTION OF THE DRAWINGS

In describing preferred embodiment of the present invention illustrated in the drawings, specified terminology is employed for the sake of clarity. However, the invention is not intended to be limited to the specific terminology so selected, and it is to be understood that each specific element includes all technical equivalents which operate in a similar purpose.

A more complete appreciation of the invention and the many attendant advantages thereof will become readily apparent from the following detailed description, particularly when considered in conjunction with the drawing in which:

FIG. 1 is a block diagram of an image processing system which an image processing apparatus of the present invention is applied to;

FIG. 5 shows an illustration of result which process of the present invention is applied to;

DESCRIPTION OF THE PREFERRED EMBODIMENT

Figure 1:
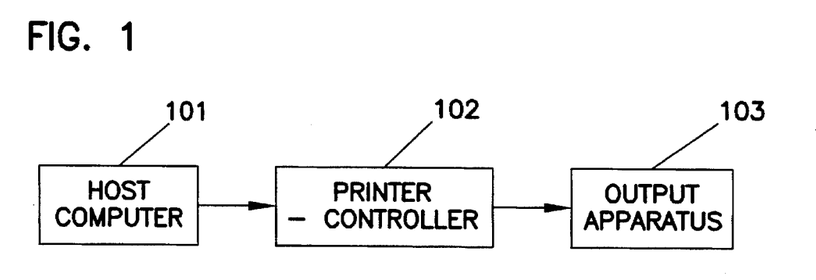

Referring to Figures, a embodiment of the present invention will be described. FIG. 1 is a block diagram of an image processing system which an image processing apparatus of the present invention is applied to. In FIG. 1, a block 101 is a host computer, a block 102 is an image processing apparatus of the present invention (this referred to as a printer-controller hereinafter), a block 103 is a output apparatus such as a laser printer. The host computer 101 and the printer controller 102, the printer controller and the output apparatus are connected respectively by the predetermined interfaces.

The operation of the image processing system in FIG. 1 will be described. The host computer 101 sends the vector image to the printer-controller 102. The printer-controller converts the vector image to the raster image and stores it in the memory within the controller. The image is sent to the output apparatus 103 and then printed in a sheet of paper.

Figure 2:
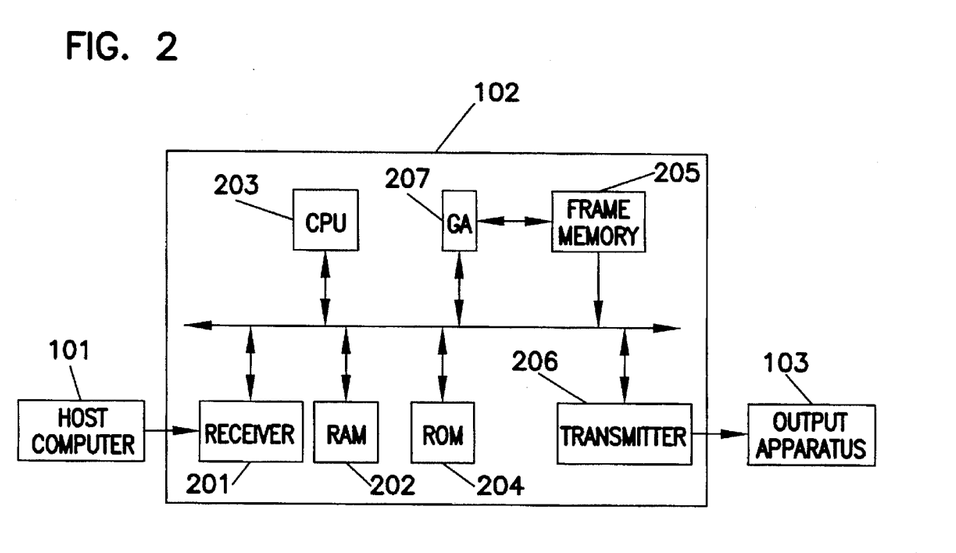
FIG. 2 is a block diagram of a printer-controller of the present invention.

FIG. 2 is a block diagram of a printer-controller of the present invention. In FIG. 2, a block 201 is a receiver, a block 202 is a RAM which stores image data, resolution of the output apparatus, multilevel, magnification of output size and the like, a block 203 is a CPU which executes many controls according to a control program, a block 204 is a ROM in which the control program is stored, a block 205 is a frame memory, a block 206 is a transmitter, and a block 207 is a GA.

The operation of the printer-controller 102 will be described. The receiver 201 receives the data such as image data, the resolution of the output apparatus, the multilevel, the magnification of output size and the like and stores them in the RAM 202. Next the CPU 203 reads the data in the RAM 204 and executes many controls according to the control program which is stored in the ROM 204. After that, the CPU 203 outputs the parameters for drawing (the contribution ratio, the density, the coordinate line y for raster scanning, the start coordinate x1, and the end coordinate x2) to the frame memory 205. Then the transmitter 206 transmits the data in the frame memory to the output apparatus 103 on the basis of command of the CPU 203.

Figure 3:
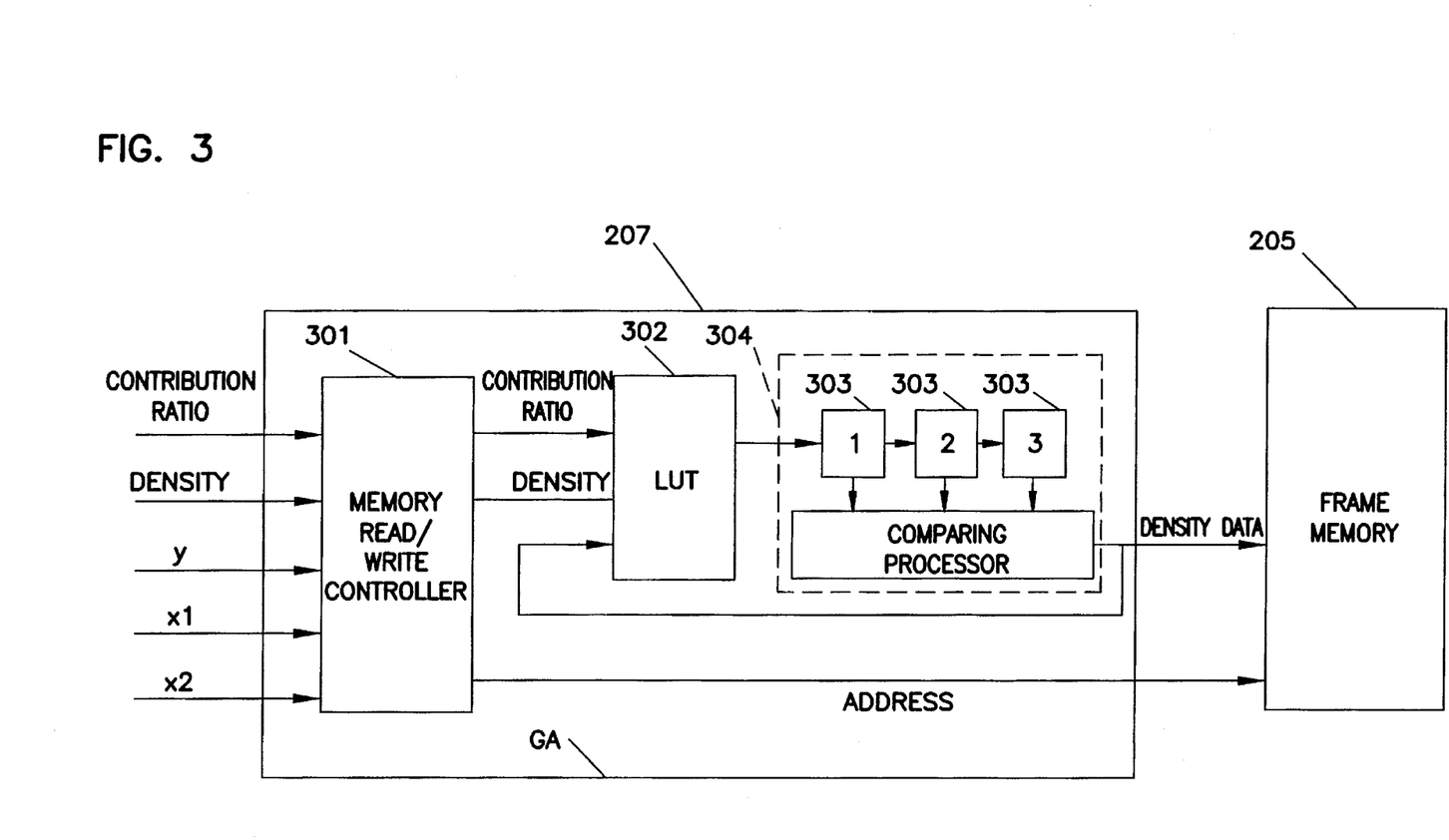
FIG. 3 is a block diagram of GA of the present invention.

FIG. 3 is a block diagram of the GA 207 shown in FIG. 2. The GA 207 is composed of a memory read/write controller 301, a LUT 302, and a comparing processor 304 which connects a three pixels comparing hardware 303 which latches the densities of continuous three pixels. The memory read/write controller 301 inputs the contribution ratio, the density, the coordinate line y for raster scanning, the start coordinate x1, and the end coordinate x2. It outputs the contribution ratio and the density to the LUT 302. The LUT 302 outputs the data to the three pixels comparing hardware 303. The frame memory 205 inputs the density data from the comparing processor 304 and the address from the memory read/write controller 301. The comparing processor 304 also outputs the density data to the LUT 302.

The operation of the GA 207 will be described. The memory read/write controller 301 inputs the coordinate line y for raster scanning, the start coordinate x1, and the end coordinate x2 from the ROM 204 by the CPU. The pixels in the area indicated by those coordinates have the same contribution ratio and the same density. The memory read/write controller 301 executes the RMW process referring to the LUT 302 on the basis of the input data and decides the provisional density. After that, the densities of adjacent three pixels are inputed to the three pixels comparing hardware 303. Those densities are compared in the comparing controller 304 and the density of the middle pixel of the three ones is decided finally and written to the frame memory 205.

Figure 9:
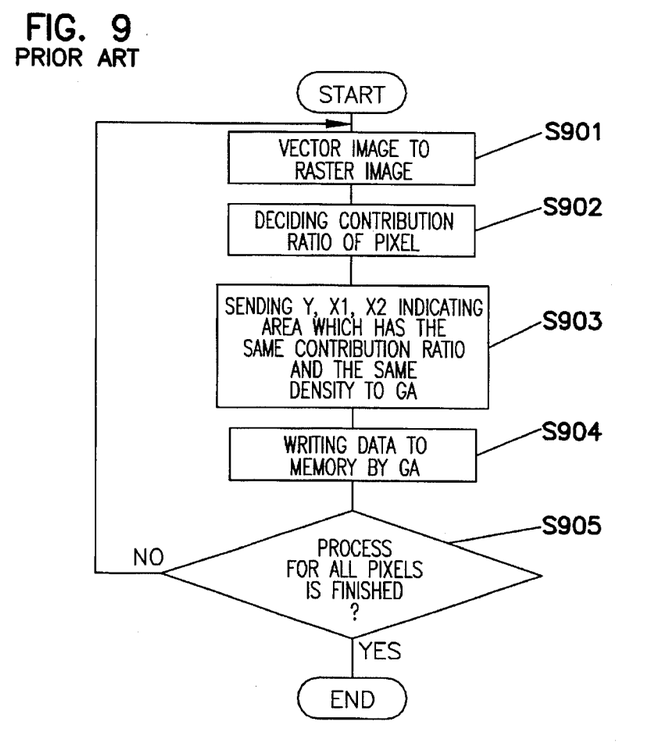
FIG. 9 is a flowchart showing conventional operation of writing data to a memory including anti-aliasing in a printer-controller.

As described above, the present invention modifies the process of writing the data to the memory by the GA 207 which is the conventional process Step 904 in FIG. 9. That is, as shown in FIG. 3, the hardware of the comparing processor 304 which compares the data inputted to the three pixels comparing hardware 303 is added before writing the data to the memory. As writing the data to the memory is controlled by this process, the problem of the overlapping portion of the gradation can be reduced.

Next, the software is also modified. That is, the densities only when the memory is read and generated in the first pixel position before the left edge of the figure and the first pixel position after the right edge of the figure. Moreover, densities for identification which are for identifying the left edge and the right edge are generated in the second position before the left edge of the figure and the second position after the right edge of the figure. Those densities for identification are also inputted to the three comparing hardware 303. The density value except the density which is written to the memory is used as the density for identification. For example, when the densities which are written to the memory are 0, 64, 128, 192, and 255, the density except those is used as the density for identification, for example 100 and the like.

Figure 4:
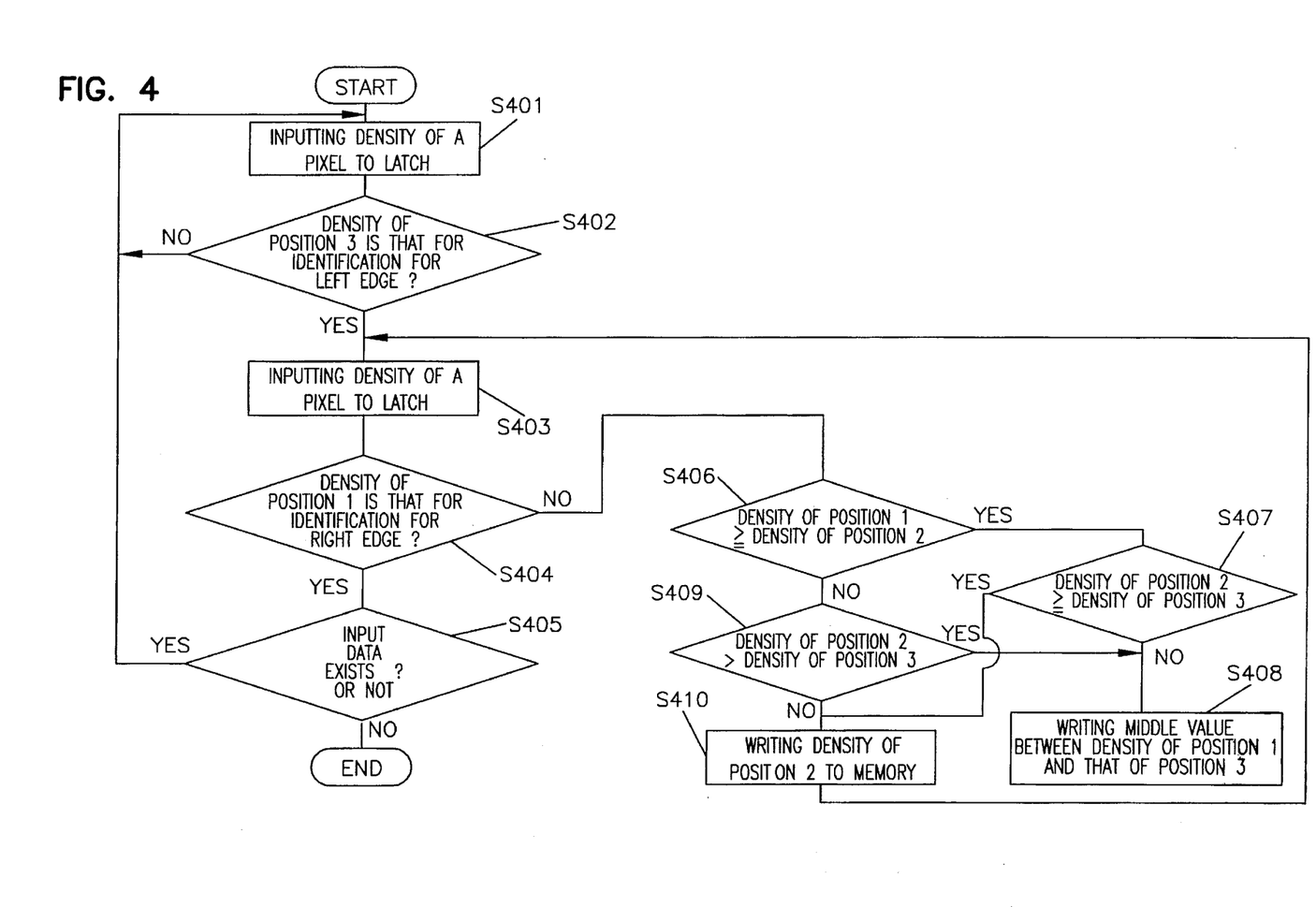
FIG. 4 is a flowchart showing algorithm of comparing processor of the present invention.

The algorithm of the comparing processor 304 will be described. FIG. 4 is a flowchart showing the algorithm. The densities of the continuous three pixels after the RMW process are latched in the three pixels comparing hardware 303 (S 101). At this time, the densities of the first positions before the left edge and after the right edge which are read and the densities for identification are also latched in this three pixels comparing processor 303. If some comparison condition is satisfied, the pixel density of the middle position of the three pixels (the density of the position "2" of the three pixels comparing hardware 303) is written to the frame memory. On the other hand, if not, the density of the middle value between the density of the left pixel and that of the right pixel is written.

FIG. 4 will be described more concretely. The pixel density is latched in succession and the density of the position "3" is judged the density for identification of the left edge (S 402). If so, the comparing process and the writing process start and another pixel is inputted (S 403). On the contrary, if not in Step 402, the process returns Step 401.

Next, the density of the position "1" is judged the density for identification of the right side (S 404). If so, it is judged that the input data exist or not (S 405). If the input data exist, the process returns Step 401. If not, the process is finished.

If the density of the position "1" is not judged the density for identification of the right edge in Step 404, the following is judged (Step 406), the density of the position "1"≧the density of the position "2".

In that judgement, if so, the following is judged (Step 407).

the density of the position "2"≧the density of the position "3".

In that judgement, if not, the middle value of the density of the position "1" and the density of the position "3" is written to the frame memory (S 408), and then the process returns Step 403.

In Step 406, if the density of the position "1"<the density of the position "2", the following is judged (Step 409), the density of the position "2">the density of the position "3".

In that judgement, if so, the process goes to Step 408. If not, the density of the position "2" is written to the frame memory 205 (Step 410), and then the process returns Step 403. In Step 407, if the density of the position "2"≧the density of the position "3", the density of the position "2" is written to the frame memory 205 (S 410), and then the process returns Step 403.

As described above, the densities which are latched in the three pixels comparing hardware 303 are compared. On the basis of the result, the density of the position "2" or that of the middle value between the densities of the position "1" and the position "3" is written to the frame memory 205. The comparing and writing to the memory process continues until the density of the position "1" is judged the density for identification of the right edge. Once the comparing and writing to the memory is finished, writing to the frame memory 205 is not executed until the density for identification of the left edge is inputted to the position "3" again.

Figure 5:
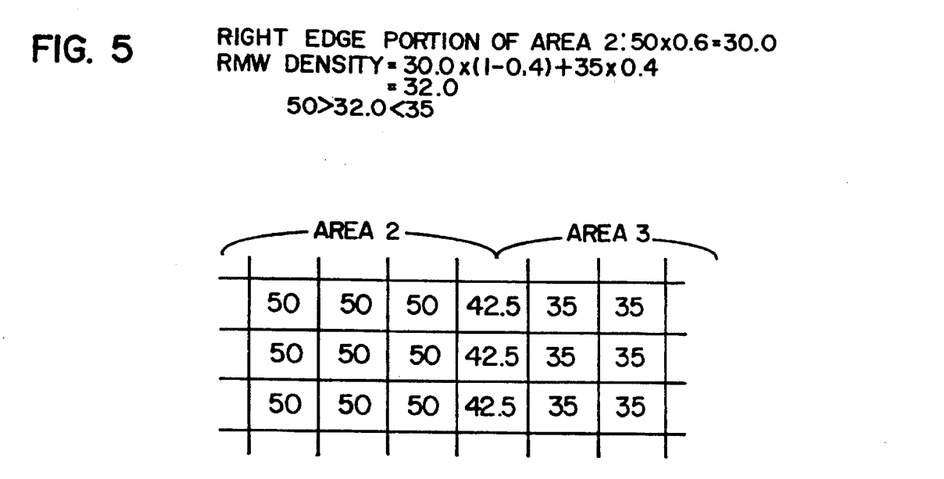

FIG. 5 shows the result when the above process is applied to the data in FIG. 13. As the density of the overlapping portion is 42.5 (it is 32 by the conventional process in FIG. 13), the the weaker density than the both adjacent densities in FIG. 13 is improved. Therefore most part of process which is executed by only the software conventionally (the process part which is that the density of the middle pixel of the continuous three pixels becomes the middle value between the both adjacent ones) can be replaced the hardware of the GA 207 (the three pixels comparing hardware 303 and the comparing processor 304).

Moreover, in this invention, the GA is modified so that the modification of the hardware and the software may be minimum. That is, the identifiers for identifying the left edge and the right edge of the figure, which are used for generating the densities for identification, are included in the parameters of the contribution ratio and the density and the like. The number of the effective bits of the parameters in the conventional apparatus are reduced. The two bits which are the reduced bits are used as the density for identification. So, as the number of bit of the parameters in this invention is same as in the conventional apparatus, the modification of the hardware and the software for including the identifiers in the contribution ratio and the density and the like can become minimum. In this case, as the reduced bits can be reduced in the most unnecessary bits of the parameters.

Figure 6:
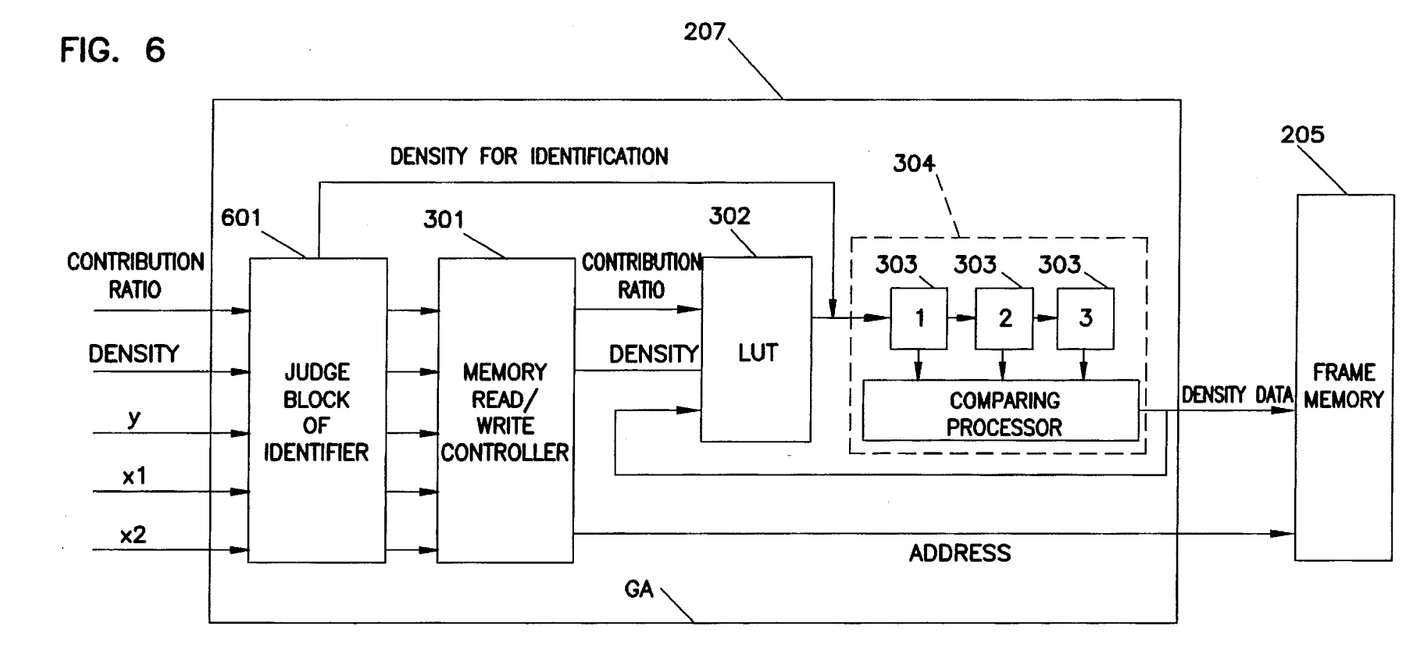
FIG. 6 is a block diagram of GA of another embodiment of the present invention.

FIG. 6 is a block diagram showing another embodiment of the present invention. In FIG. 6, a judge block of the identifier 601 which inputs the parameters (the contribution ratio, density, the coordinate line y for raster scanning, the start coordinate x1, and the end coordinate x2) and judges the left edge, the right edge, or the other is arranged before the memory read/write block 301. The elements in FIG. 6 which are same as those in FIG. 3 are represented as the same numbers and the explanation is omitted.

The operation of the GA 207 in FIG. 6 will be described. The judge block of identification judges the left edge, the right edge, or the other by the parameters of the contribution ratio, density, the coordinate line y for raster scanning, the start coordinate x1, and the end coordinate x2. If the parameters indicate the left edge or the right edge, the density for identification is inputted to the three pixels hardware 303 directly.

Figure 7:
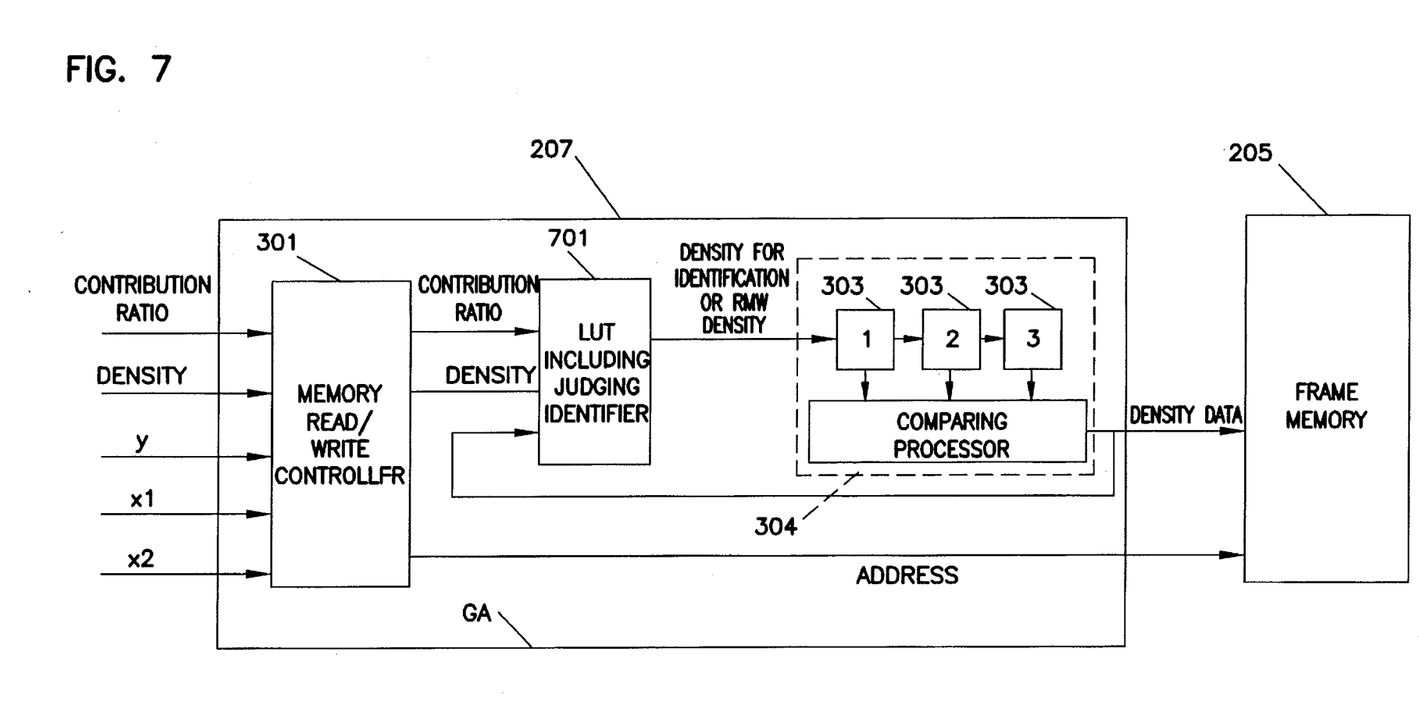
FIG. 7 is a block diagram of GA of another embodiment of the present invention.

FIG. 7 is a block diagram showing another embodiment of the present invention. In FIG. 7, the LUT 302 in FIG. 3 is replaced a LUT 701 which includes judging the identifier. The elements in FIG. 6 which are same as those in FIG. 3 are represented as the same numbers and the explanation is omitted.

The operation of the GA 207 in FIG. 7 will be described. The LUT 701 which includes judging the identifier, generates the density on the basis of the parameters. That is, it generates the constant value of the density for identification when the parameters correspond to the left edge or the right edge. The density for identification (or RMW density) is inputted to the three pixels hardware 303.

As described above, as most part of process which is executed by only the software conventionally (the process part which is that the density of the middle pixel of the continuous three pixels becomes the middle value between the both adjacent ones) is replaced the hardware of the GA 207 (the three pixels comparing hardware 303 and the comparing processor 304), the better image quality and the high speed processing can be achieved. Moreover, as the generation of the supplimentary data (the density for identification and the like) which correspond to the modification of the algorithm is done by the modification of the GA, the minimum modification of the hardware and the software can be achieved.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An image processing apparatus for deciding pixel densities of respective pixels using an anti-aliasing process for left and right edges of a figure, and for sending resulting pixel density data to a memory, the apparatus comprising:

a) memory read/write control means, the memory read/write control means including:
   a1) means for inputting:
      i) a contribution ratio,
      ii) a density value,
      iii) a y coordinate for a raster line,
      iv) a start coordinate $x_1$, and
      v) an end coordinate $x_2$; and
   a2) means, responsive to the inputting means, for sending an address to the memory;
b) an arithmetic means, responsive to the memory read/write control means, for providing pixel densities based on the contribution ratio and the density value, and for executing a read-modify-write process;
c) hardware, responsive to the arithmetic means and including means for latching densities of three respective contiguous pixels, including densities for a middle pixel and two outer pixels; and
d) a comparing processor, responsive to the hardware, the comparing processor including:
   d1) means for deciding a resulting pixel density corresponding to the middle pixel, the deciding means including:
      i) means for comparing the densities of the three contiguous pixels;
      ii) means for deciding the resulting pixel density as being an intermediate value between the densities of the two outer pixels if the middle pixel's density is not between the densities of the two outer pixels; and
      iii) means for deciding the resulting pixel density as being the density of the middle pixel if the middle pixel's density is between the densities of the two outer pixels; and
   d2) means for sending the resulting pixel density data to the memory;
wherein identification densities for identifying edges of the figure are generated in the second position before the left edge of the figure and in the second position after the right edge of the figure.

2. The apparatus of claim 1, wherein:
identifiers for identifying the left edge and the right edge of the figure are included in parameters which are input to the apparatus.

3. The apparatus of claim 2, further comprising:
means, connected before the input of the memory read/write control means, for generating the identification densities for identifying the edges of the figure.

4. The apparatus of claim 2, wherein the arithmetic means includes:
means for generating the identification densities for identifying the edges of the figure.

5. An image processing apparatus for deciding pixel densities of respective pixels using an anti-aliasing process for left and right edges of a figure, the apparatus comprising:

a) a receiver for receiving data from a host computer;
b) a random access memory (RAM) for storing the data received from the host computer;
c) a read-only memory (ROM) for storing a control program;
d) a central processing unit (CPU) for executing the control program;
e) memory read/write control means, the memory read/write control means including:
   e1) means for inputting:
      i) a contribution ratio,
      ii) a density value,
      iii) a y coordinate for a raster line,
      iv) a start coordinate $x_1$, and
      v) an end coordinate $x_2$; and
   e2) means, responsive to the inputting means, for providing a memory address;
f) an arithmetic means, responsive to the memory read/write control means, for providing pixel densities based on the contribution ratio and the density value, and for executing a read-modify-write process;
g) hardware, responsive to the arithmetic means and including means for latching densities of three respective contiguous pixels, including densities for a middle pixel and two outer pixels; and
h) a comparing processor, responsive to the hardware, the comparing processor including:
   h1) means for deciding a resulting pixel density corresponding to the middle pixel, the deciding means including:
      i) means for comparing the densities of the three contiguous pixels;
      ii) means for deciding the resulting pixel density as being an intermediate value between the densities of the two outer pixels if the middle pixel's density is not between the densities of the two outer pixels; and
      iii) means for deciding the resulting pixel density as being the density of the middle pixel if the middle pixel's density is between the densities of the two outer pixels; and
   h2) means for providing the resulting pixel density data;
i) a frame memory for storing the resulting pixel density data from the comparing processor in accordance with the memory address from the memory read/write control means;
wherein identification densities for identifying edges of the figure are generated in the second position before the left edge of the figure and in the second position after the right edge of the figure.

6. The apparatus of claim 5, further comprising:
an output device for printing an image including the figure.

7. An image processing apparatus for deciding pixel densities of respective pixels using an anti-aliasing process for left and right edges of a figure, and for sending resulting pixel density data to a memory, the apparatus comprising:

a) memory read/write control means, the memory read/write control means including:
   a1) means for inputting:
      i) a contribution ratio,
      ii) a density value,
      iii) a y coordinate for a raster line,
      iv) a start coordinate $x_1$, and
      v) an end coordinate $x_2$; and
   a2) means, responsive to the inputting means, for sending an address to the memory;
b) a look-up table (LUT), responsive to the memory read/write control means, for providing pixel densities based on the contribution ratio and the density value, and for executing a read-modify-write process;

c) hardware, responsive to the LUT and including means for latching densities of three respective contiguous pixels, including densities for a middle pixel and two outer pixels; and d) a comparing processor, responsive to the hardware, the comparing processor including:
   d1) means for deciding a resulting pixel density corresponding to the middle pixel, the deciding means including:
      i) means for comparing the densities of the three contiguous pixels;
      ii) means for deciding the resulting pixel density as being an intermediate value between the densities of the two outer pixels if the middle pixel's density is not between the densities of the two outer pixels; and
      iii) means for deciding the resulting pixel density as being the density of the middle pixel if the middle pixel's density is between the densities of the two outer pixels; and
   d2) means for sending the resulting pixel density data to the memory;

wherein identification densities for identifying edges of the figure are generated in the second position before the left edge of the figure and in the second position after the right edge of the figure.

* * * * *

UNITED STATES PATENT AND TRADEMARK OFFICE
CERTIFICATE OF CORRECTION

PATENT NO. : 5,579,450
DATED      : November 26, 1996
INVENTOR(S): Hitomi Hanyu and Yoshiaki Hanyu It is certified that error appears in the above-indentified patent and that said Letters Patent is hereby corrected as shown below:

Column 2, line 51, change "decide" to --decides--.

Column 6, line 52, change "GA" to --GK--.

Column 7, Claim 1, line 24, change "responsive" to --response--.

Signed and Sealed this

Eighth Day of July, 1997

BRUCE LEHMAN

Attest:

Attesting Officer

Commissioner of Patents and Trademarks